US012319305B2

(12) United States Patent
Oishi et al.

(10) Patent No.: US 12,319,305 B2
(45) Date of Patent: Jun. 3, 2025

(54) DISPLAY CONTROL DEVICE, DISPLAY CONTROL METHOD, AND RECORDING MEDIUM

(71) Applicant: Panasonic Intellectual Property Management Co., Ltd., Osaka (JP)

(72) Inventors: Masahito Oishi, Kanagawa (JP); Tadahiro Uchikoshi, Kanagawa (JP); Shintaro Miike, Tokyo (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 248 days.

(21) Appl. No.: 17/974,218

(22) Filed: Oct. 26, 2022

(65) Prior Publication Data

US 2023/0133086 A1 May 4, 2023

(30) Foreign Application Priority Data

Oct. 28, 2021 (JP) ................. 2021-176685

(51) Int. Cl.
*B60W 50/14* (2020.01)
*B60K 35/00* (2024.01)
(Continued)

(52) U.S. Cl.
CPC ............. *B60W 50/14* (2013.01); *B60K 35/00* (2013.01); *B60W 60/005* (2020.02);
(Continued)

(58) Field of Classification Search
CPC ............... B60W 50/14; B60W 60/005; B60W 2050/146; B60K 35/00; B60K 35/81;
(Continued)

(56) References Cited

U.S. PATENT DOCUMENTS

2007/0061068 A1* 3/2007 Okamoto ......... G08G 1/096716
701/532
2012/0218295 A1 8/2012 Hashikawa et al.
(Continued)

FOREIGN PATENT DOCUMENTS

JP 2018073380 A * 5/2018
JP 2018-203008 12/2018
(Continued)

OTHER PUBLICATIONS

JP-2018073380-A machine tranlsation (Year: 2018).*
Office Action from Japan Patent Office (JPO) in Japanese Patent Appl. No. 2021-176685, dated Sep. 26, 2023, together with an English language translation.

*Primary Examiner* — Todd Melton
*Assistant Examiner* — Oliver Tan
(74) *Attorney, Agent, or Firm* — Greenblum & Bernstein, P.L.C.

(57) ABSTRACT

A display control device performs display control on the displays of a vehicle. The display control device includes an obtainer and a display controller. The obtainer obtains switching information indicating that switching between driving modes including an autonomous driving mode and a manual driving mode is to be performed in the vehicle. When the switching information indicates that first switching which is switching from the autonomous driving mode to the manual driving mode is to be performed, the display controller causes, before completion of the first switching, (i) one of the displays (first display) to display first information indicating that the first switching is to be performed and third information indicating that another display (second display) is displaying second information for assisting the user of the vehicle in driving in the manual driving mode and (ii) the second display to display the second information.

9 Claims, 11 Drawing Sheets

(51) Int. Cl.
*B60K 35/23* (2024.01)
*B60K 35/28* (2024.01)
*B60K 35/81* (2024.01)
*B60W 60/00* (2020.01)
*G06F 3/01* (2006.01)
*G06F 3/14* (2006.01)

(52) U.S. Cl.
CPC ............ *G06F 3/013* (2013.01); *G06F 3/1423* (2013.01); *B60K 35/23* (2024.01); *B60K 35/28* (2024.01); *B60K 35/81* (2024.01); *B60K 2360/175* (2024.01); *B60W 2050/146* (2013.01)

(58) Field of Classification Search
CPC .. B60K 35/28; B60K 35/23; B60K 2360/175; G06F 3/013; G06F 3/1423
See application file for complete search history.

(56) References Cited

U.S. PATENT DOCUMENTS

| | | | |
|---|---|---|---|
| 2016/0098017 A1* | 4/2016 | Park | G04G 21/04 368/10 |
| 2016/0196247 A1* | 7/2016 | Lee | H04L 63/06 715/753 |
| 2018/0281788 A1 | 10/2018 | Uchida | |
| 2018/0345790 A1* | 12/2018 | Mimura | B60K 35/00 |
| 2019/0004514 A1 | 1/2019 | Hiwatashi et al. | |
| 2019/0094856 A1* | 3/2019 | Kawate | G08G 1/16 |

FOREIGN PATENT DOCUMENTS

| | | |
|---|---|---|
| JP | 2019-010929 | 1/2019 |
| WO | 2011/055699 | 5/2011 |
| WO | 2017/060978 | 4/2017 |
| WO | 2017/169608 | 10/2017 |

* cited by examiner

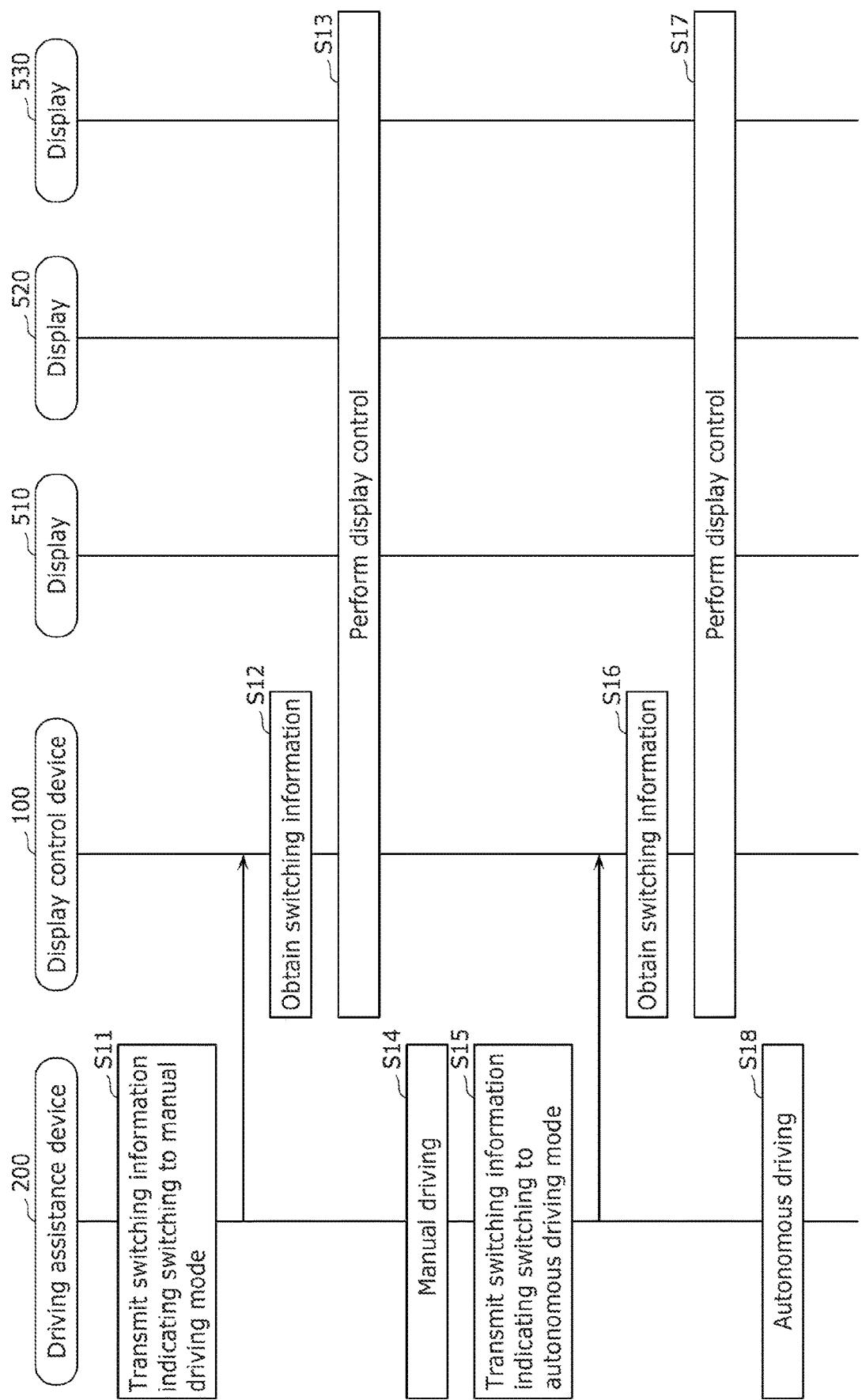

DISPLAY CONTROL DEVICE, DISPLAY CONTROL METHOD, AND RECORDING MEDIUM

CROSS REFERENCE TO RELATED APPLICATION

The present application is based on and claims priority of Japanese Patent Application No. 2021-176685 filed on Oct. 28, 2021.

FIELD

The present disclosure relates to a display control device, a display control method, and a recording medium.

BACKGROUND

There are conventionally displays that are disposed in vehicles and notify information to users such as the drivers of the vehicles.

Patent Literature 1 (PTL 1) discloses a driving assistance device that causes a display to display a guidance image for instructing a driver to hold a steering wheel before a vehicle switches from an autonomous driving mode to a manual driving mode.

Patent Literature 2 (PTL 2) discloses an autonomous-driving control device that provides switching guidance to instruct the driver of a vehicle to switch from an autonomous driving mode to a manual driving mode and performs driving assistance control until predetermined conditions are satisfied after completion of switching to the manual driving mode.

CITATION LIST

Patent Literature

[PTL 1]
Japanese Unexamined Patent Application Publication No. 201 9-10929
[PTL 2]
WO 2017/060978

SUMMARY

However, the driving assistance device according to PTL 1 and the autonomous-driving control device according to PTL 2 can be improved upon.

In view of this, the present disclosure provides a display control device, a display control method, and a recording medium that are capable of improving upon the above related art.

A display control device according to one aspect of the present disclosure performs display control on the first display and the second display of a vehicle, the second display being different from the first display. The display control device includes an obtainer and a display controller. The obtainer obtains switching information indicating that switching between driving modes including an autonomous driving mode and a manual driving mode is to be performed in the vehicle. The display controller causes, before completion of first switching, (i) the first display to display first information and third information and (ii) the second display to display second information when the switching information indicates that the first switching is to be performed, the first switching being switching from the autonomous driving mode to the manual driving mode, the first information indicating that the first switching is to be performed, the second information being information for assisting the user of the vehicle in driving in the manual driving mode, the third information indicating that the second display is displaying the second information.

A display control method according to another aspect of the present disclosure is a method for performing display control on the first display and the second display of a vehicle, the second display being different from the first display. The display control method includes obtaining switching information indicating that switching between driving modes including an autonomous driving mode and a manual driving mode is to be performed in the vehicle and causing, before completion of first switching, (i) the first display to display first information and third information and (ii) the second display to display second information when the switching information indicates that the first switching is to be performed, the first switching being switching from the autonomous driving mode to the manual driving mode, the first information indicating that the first switching is to be performed, the second information being information for assisting the user of the vehicle in driving in the manual driving mode, the third information indicating that the second display is displaying the second information.

In addition, a recording medium according to still another aspect of the present disclosure is a non-transitory computer-readable recording medium having stored thereon a program for causing a computer to execute the display control method according to one aspect of the present disclosure.

It should be noted that these general or specific aspects may be embodied as a system, a method, an integrated circuit, a computer program, or a recording medium, such as a computer-readable CD-ROM, or may be embodied as any combination of the system, the method, the integrated circuit, the computer program, and the recording medium.

Further improvements can be made by using, for example, the display control device according to one aspect of the present disclosure.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 7 is a sequence diagram illustrating an example of operation of the display system.

Figure 1:
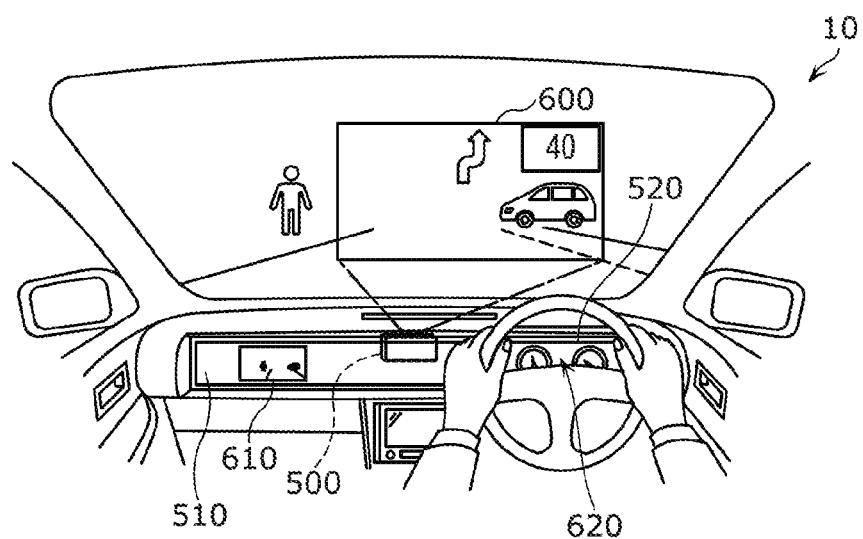
FIG. 1 schematically illustrates the interior of a vehicle according to an embodiment.

DESCRIPTION OF EMBODIMENTS (Underlying Knowledge Forming the Basis of the Present Disclosure)

In the related art, even if a guidance image is displayed and a user is notified that the driving mode of a vehicle will be switched to a manual driving mode, the user may drive the vehicle while not being fully aware of the driving mode of the vehicle or the situation surrounding the vehicle. Thus, it is difficult for the user to properly drive the vehicle soon after the driving mode is switched from an autonomous driving mode to the manual driving mode.

The inventors of the present disclosure arrived at creating a display control device, a display control method, and a recording medium that can assist a user in properly driving a vehicle soon after the driving mode is switched from an autonomous driving mode to a manual driving mode.

A display control device according to one aspect of the present disclosure performs display control on the first display and the second display of a vehicle, the second display being different from the first display. The display control device includes an obtainer and a display controller. The obtainer obtains switching information indicating that switching between driving modes including an autonomous driving mode and a manual driving mode is to be performed in the vehicle. The display controller causes, before completion of first switching, (i) the first display to display first information and third information and (ii) the second display to display second information when the switching information indicates that the first switching is to be performed, the first switching being switching from the autonomous driving mode to the manual driving mode, the first information indicating that the first switching is to be performed, the second information being information for assisting the user of the vehicle in driving in the manual driving mode, the third information indicating that the second display is displaying the second information.

Thus, by displaying the two information items, the first information and the third information, on the first display, it is possible to notify the driver that the first switching will be performed and that the second display is displaying the second information useful for driving the vehicle in the manual driving mode. The first display is caused to display the third information, and the second display is caused to display the second information. Thus, displaying of the third information guides the gaze of the user to the second display, which enables the user to visually check the second information. In this manner, the user can be aware that the first switching will be performed and aware of the second information useful for driving in the manual driving mode at the time of the switching. Accordingly, the user can properly drive the vehicle soon after the driving mode is switched from the autonomous driving mode to the manual driving mode.

In addition, the third information may indicate the position of an area displaying the second information.

Thus, the user can readily identify the position of the area displaying the second information. Accordingly, the user can readily visually check the second information.

In addition, the obtainer may obtain gaze information indicating the gaze of the user. The second information may include notices. When the second display is displaying the notices, the display controller may identify, according to the gaze of the user indicated by the gaze information, a notice displayed in an area at which the gaze of the user is directed and cause the second display to hide the notice identified.

Thus, the display status of the notice presumably looked at and checked by the user is changed to hide, which can reduce inconvenience caused by the notices being displayed.

In addition, in a period until the completion of the first switching, the display controller may change the display style of at least one of the first information, the second information, and the third information from a first display style to a second display style.

Thus, it is possible to notify, in stages, the user that the timing of the switching from the autonomous driving mode to the manual driving mode is approaching. Accordingly, the user can be aware of the time taken to switch to the manual driving mode.

In addition, when the obtainer obtains, before the completion of the first switching, new switching information indicating that second switching is to be performed, the display controller may cause, before completion of the second switching, the first display to display fourth information indicating that the second switching is to be performed, the second switching being switching from the manual driving mode to the autonomous driving mode.

Thus, the user can be aware that the driving mode will return to the autonomous driving mode.

In addition, in a period until the completion of the first switching, the display controller may change the display style of at least one of the first information, the second information, and the third information from a first display style to a second display style. The obtainer obtains, before the completion of the first switching, new switching information indicating that second switching which is switching from the manual driving mode to the autonomous driving mode is to be performed. In this case, before completion of the second switching, the display controller may (i) cause the first display to display fourth information indicating that the second switching is to be performed and (ii) change the display style of at least one of the first information, the second information, and the third information from the second display style to the first display style.

Thus, the user can be aware of the time taken to return to the autonomous driving mode.

In addition, the first display may be a head-up display, and the second display may be a display mounted on the dashboard of the vehicle.

Thus, the user can look at the first display while looking forward (looking at the area ahead of the vehicle). Accordingly, the user can readily check the first information and the third information while preparing for driving. In addition, by looking at the second display mounted on the dashboard, the user can visually check the second information.

In addition, a display control method according to another aspect of the present disclosure is a method for performing display control on the first display and the second display of a vehicle, the second display being different from the first display. The display control method includes obtaining switching information indicating that switching between driving modes including an autonomous driving mode and a manual driving mode is to be performed in the vehicle and causing, before completion of first switching, (i) the first display to display first information and third information and (ii) the second display to display second information when the switching information indicates that the first switching is to be performed, the first switching being switching from the autonomous driving mode to the manual driving mode, the first information indicating that the first switching is to be performed, the second information being information for assisting the user of the vehicle in driving in the manual driving mode, the third information indicating that the second display is displaying the second information.

Thus, by displaying the two information items, the first information and the third information, on the first display, it is possible to notify the driver that the first switching will be performed and that the second display is displaying the second information useful for driving the vehicle in the manual driving mode. The first display is caused to display the third information, and the second display is caused to display the second information. Thus, displaying of the third information guides the gaze of the user to the second display, which enables the user to visually check the second information. In this manner, the user can be aware that the first switching will be performed and aware of the second information useful for driving in the manual driving mode at the time of switching. Accordingly, the user can properly drive the vehicle soon after the driving mode is switched from the autonomous driving mode to the manual driving mode.

It should be noted that these general or specific aspects may be embodied as a system, a method, an integrated circuit, a computer program, or a non-transitory recording medium, such as a computer-readable CD-ROM, and may be embodied by any combination of the system, the method, the integrated circuit, the computer program, and the non-transitory recording medium.

An embodiment is described below in detail with reference to the drawings.

It should be noted that the embodiment described below shows general or specific examples. The numerical values, shapes, materials, structural elements, positions and connections of the structural elements, steps, order of the steps, and other descriptions provided in the embodiment below are mere examples and are not intended to limit the present disclosure. In addition, among the structural elements included in the embodiment below, the structural elements not included in the independent claims, which represent superordinate concepts, are described as optional structural elements. In addition, the drawings are schematic views and are not necessarily precisely drawn. Thus, for instance, scales in the drawings are not necessarily the same. In the drawings, identical structural elements are assigned the same reference symbols.

Embodiment

[Configuration]

FIG. 1 schematically illustrates the interior of vehicle 10 according to an embodiment.

Display control device 100 controls displays to control images displayed on the displays. In the embodiment, display control device 100 controls display 500, display 510, and display 520. That is, display control device 100 performs display control on displays 500, 510, and 520 of vehicle 10. Displays 500, 510, and 520 are different devices.

Each of displays 500, 510, and 520 displays an image output by display control device 100. Display control device 100 creates image 600, image 610, and image 620 on the basis of information items obtained by driving assistance device 200 and object detection device 300 and causes display 500, display 510, and display 520 to display image 600, image 610, and image 620, respectively. In this manner, a user, such as a driver, is notified of information items included in images 600, 610, and 620. The information items notified to the user include, for example, information for assisting the user in driving vehicle 10.

It should be noted that as long as displays 500, 510, and 520 can display an image, each display may be any display, such as a liquid-crystal display or a head-up display (HUD), and is not limited to a particular display. In the embodiment, display 500 is a HUD. In the embodiment, display 510 and display 520 are liquid-crystal displays.

Vehicle 10 is a vehicle, such as an automobile or a motorcycle, and an automobile in the embodiment. It should be noted that vehicle 10 may be, for example, a ship or an aircraft.

Figure 2:
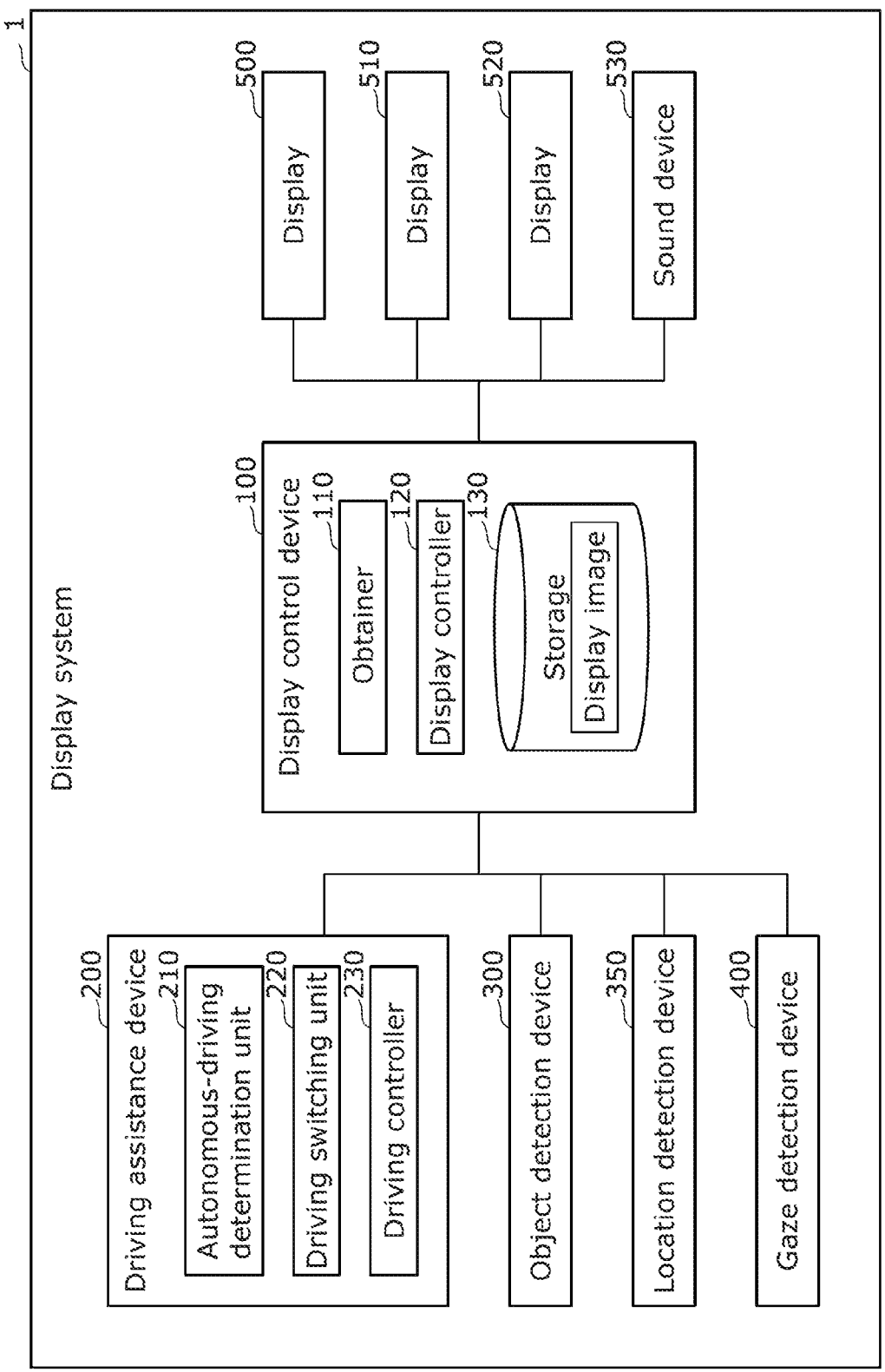
FIG. 2 is a block diagram illustrating a configuration of a display system including a display control device according to the embodiment.

FIG. 2 is a block diagram illustrating a configuration of display system 1 including display control device 100 according to the embodiment.

Display system 1 includes display control device 100, driving assistance device 200, object detection device 300, location detection device 350, gaze detection device 400, displays 500, 510, and 520, and sound device 530. Display system 1 is included in vehicle 10.

A configuration of driving assistance device 200 is described below.

Driving assistance device 200 includes autonomous-driving determination unit 210, driving switching unit 220, and driving controller 230. Driving assistance device 200 is a controller that performs control to assist the user in driving.

Autonomous-driving determination unit 210 determines whether vehicle 10 can drive in an autonomous driving mode, according to, for example, the driving state of vehicle 10 and the situation surrounding vehicle 10. Autonomous-driving determination unit 210 may determine whether vehicle 10 can drive in the autonomous driving mode, according to, for example, the driving state of vehicle 10 and the situation surrounding vehicle 10 which are predicted to appear after a predetermined time period. Specifically, if vehicle 10 is predicted to pass, after a predetermined time period, a road junction in a driving route and given points before and after the road junction, autonomous-driving determination unit 210 may determine that vehicle 10 cannot drive in the autonomous driving mode after the predetermined time period. Autonomous-driving determination unit 210 repeatedly determines whether vehicle 10 can drive in the autonomous driving mode at predetermined time intervals and outputs determination results to driving switching unit 220.

Regarding determination results by autonomous-driving determination unit 210, when a transition is made from a result showing that vehicle 10 cannot drive in the autonomous driving mode to a result showing that vehicle 10 can drive in the autonomous driving mode, driving switching unit 220 switches the driving mode of vehicle 10 from the manual driving mode to the autonomous driving mode after a predetermined time period. Thus, driving switching unit 220 causes driving controller 230 to start the autonomous driving mode of vehicle 10 after the predetermined time period. It should be noted that the timing at which driving switching unit 220 causes driving controller 230 to start the autonomous driving mode is not limited to the time point at which the predetermined time period has passed and may be the timing at which the transition to the result showing that vehicle 10 can drive in the autonomous driving mode is made.

Here, regarding the determination results by autonomous-driving determination unit 210, the transition is made from the result showing that vehicle 10 cannot drive in the autonomous driving mode to the result showing that vehicle 10 can drive in the autonomous driving mode. In this case, the latest determination result obtained from autonomous-driving determination unit 210 shows that vehicle 10 can drive in the autonomous driving mode, and the determination result obtained from autonomous-driving determination unit 210 just before the obtainment of the latest determination result shows that vehicle 10 cannot drive in the autonomous driving mode.

Regarding the determination results by autonomous-driving determination unit 210, when a transition is made from the result showing that vehicle 10 can drive in the autonomous driving mode to the result showing that vehicle 10 cannot drive in the autonomous driving mode, driving switching unit 220 switches the driving mode of vehicle 10 from the autonomous driving mode to the manual driving mode after a predetermined time period. Thus, driving switching unit 220 causes driving controller 230 to end the autonomous driving mode of vehicle 10 after the predetermined time period.

Here, regarding the determination results by autonomous-driving determination unit 210, the transition is made from the result showing that vehicle 10 can drive in the autonomous driving mode to the result showing that vehicle 10 cannot drive in the autonomous driving mode. In this case, the latest determination result obtained from autonomous-driving determination unit 210 shows that vehicle 10 cannot drive in the autonomous driving mode, and the determination result obtained from autonomous-driving determination unit 210 just before the obtainment of the latest determination result shows that vehicle 10 can drive in the autonomous driving mode.

In addition, when switching between the driving modes, driving switching unit 220 outputs, to display controller 120, switching information indicating that switching between the driving modes will be performed. For instance, when switching from the manual driving mode to the autonomous driving mode (when performing a second switching), driving switching unit 220 outputs, to display control device 100, switching information indicating that the driving mode will be switched to the autonomous driving mode. The switching information in this case includes the timing of the switching to the autonomous driving mode. For instance, when switching from the autonomous driving mode to the manual driving mode (when performing a first switching), driving switching unit 220 outputs, to display control device 100, switching information indicating that the driving mode will be switched to the manual driving mode. The switching information in this case includes the timing of the switching to the manual driving mode.

Driving controller 230 drives vehicle 10 in the autonomous driving mode by controlling devices, such as the engine (motor), brakes, and steering of vehicle 10 which are parts for driving, by using the results of object detection device 300 detecting objects around vehicle 10, map data, a scheduled driving route to a destination, and driving location information. The driving location information is used to identify the location of vehicle 10 on the driving route. The scheduled driving route to the destination is a scheduled driving route for vehicle 10 determined by the user by using a car navigation system (not illustrated). For example, the user inputs the destination to the car navigation system. The results of detecting the objects are used, for example, to avoid obstacles on the scheduled driving route for vehicle 10.

Object detection device 300 is described below.

Object detection device 300 detects objects around vehicle 10 and outputs the results of detecting the objects to driving assistance device 200. The objects around vehicle 10 include, for example, a vehicle driving in a surrounding area of vehicle 10, a pedestrian, and other obstacles. For instance, object detection device 300 detects an object within a predetermined distance from vehicle 10. For instance, object detection device 300 may detect an object by taking an image of at least a part of the surroundings of vehicle 10 by using a camera and identifying the object in the image by using a machine learning model to detect an object. Object detection device 300 may be a device, such as a light detection and ranging (LiDAR), that detects the distance to an object in the following manner. Object detection device 300 emits laser beams, which then reach an object and reflects back to object detection device 300. By measuring the round-trip travel time of the laser beams between object detection device 300 and the object, object detection device 300 detects the distance to the object. Object detection device 300 may be a combination of a device that identifies an object from an image taken by a camera and a device that detects an object from the detection result of a LiDAR. That is, object detection device 300 is embodied as a device including a camera and a computer that performs processing to identify an object from an image taken by the camera, a device including a LiDAR and a computer that performs processing to analyze the detection result of the LiDAR and detect an object, or a device made by combining the above-mentioned devices.

Location detection device 350 is described below.

Location detection device 350 detects the location (driving location) of vehicle 10 and outputs, to driving assistance device 200, driving location information that is the result of detection. The driving location information is, for example, location information indicating the current location of vehicle 10 and obtained by receiving a signal from a satellite positioning system (not illustrated), such as a global positioning system (GPS). Location detection device 350 may detect the driving location of vehicle 10 by comparing the detection result of the LiDAR and detection results obtained in advance according to the driving locations of vehicle 10 and stored in a storage device such as memory. Location detection device 350 is made up of, for example, a receiving device that receives a signal from a satellite positioning system and a computer that performs processing to obtain location information from the signal.

Gaze detection device 400 is described below.

Gaze detection device 400 detects the gaze of the user (driver) and outputs gaze information that is a detection result to display control device 100. For instance, gaze detection device 400 may detect the gaze of the user according to the direction of user's eyes detected from an image obtained from a camera, which is disposed in front of a driver's seat and takes an image including the user's eyes. Gaze detection device 400 is made up of, for example, a camera and a computer that performs processing to detect the gaze of the user from an image obtained from the camera.

A configuration of display control device 100 is described below.

Display control device 100 includes obtainer 110, display controller 120, and storage 130.

Obtainer 110 obtains switching information indicating that switching between driving modes including the autonomous driving mode and the manual driving mode will be performed in vehicle 10. By obtaining the switching information, obtainer 110 detects that the switching between the driving modes will be performed and detects the timing of the switching. When the switching information indicates that the first switching will be performed, obtainer 110 detects that the first switching will be performed at the timing included in the switching information. When the switching information indicates that the second switching will be performed, obtainer 110 detects that the second switching will be performed at the timing included in the switching information.

In addition, obtainer 110 may obtain the gaze information indicating the gaze of the user.

Display controller 120 causes displays 500, 510, and 520 to display images corresponding to the driving mode. Specific examples of the images are described.

Figure 3:
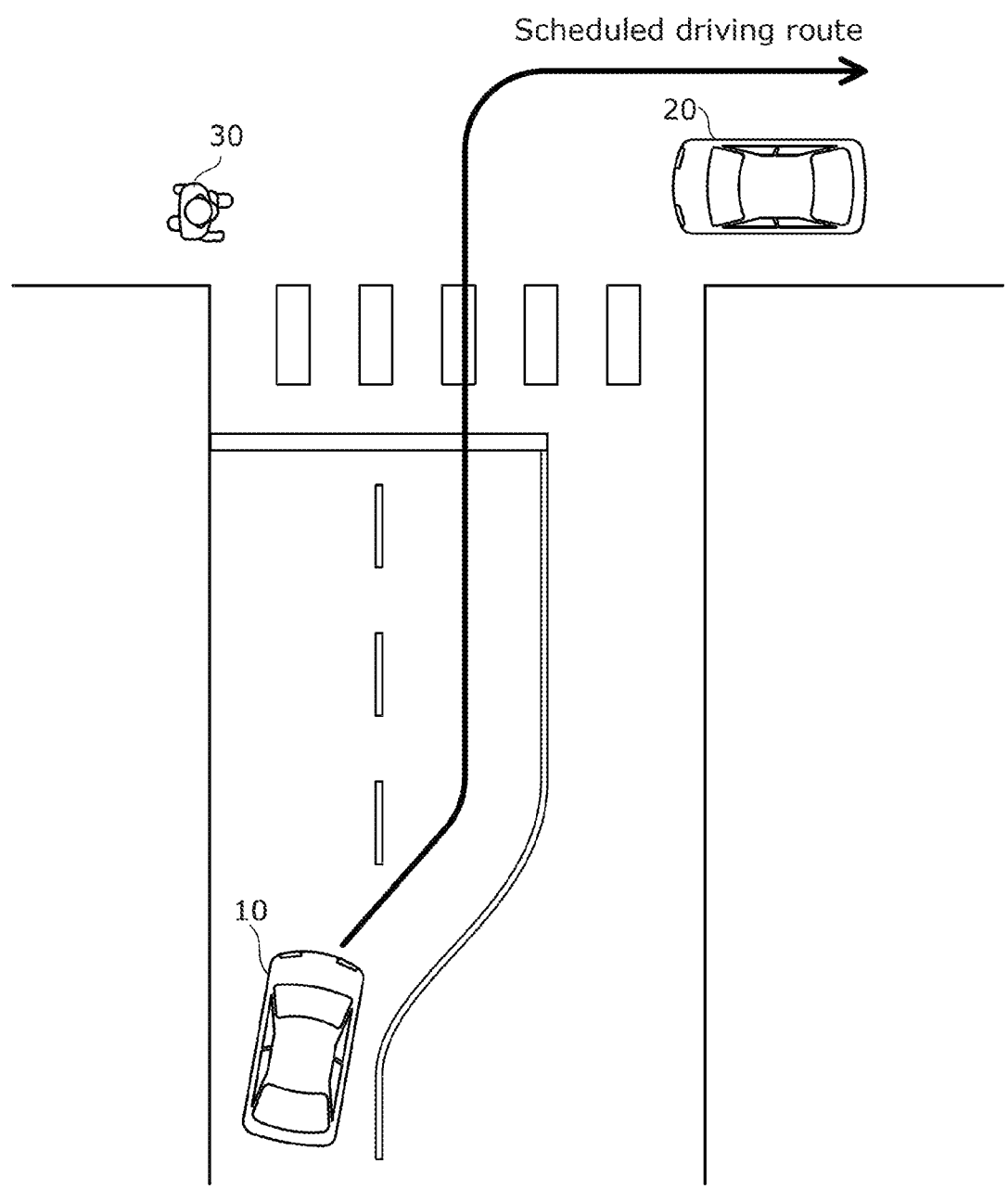
FIG. 3 illustrates an example of a vehicle driving scene.
Figure 4:
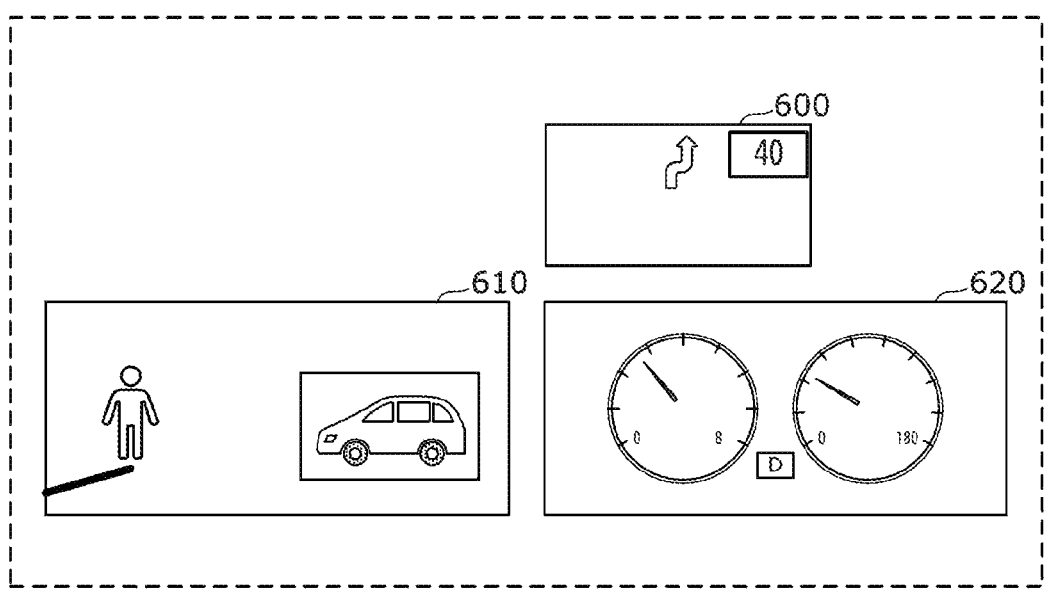
FIG. 4 illustrates examples of information items displayed on displays.

FIG. 3 illustrates an example of a vehicle driving scene. FIG. 4 illustrates examples of information items displayed on displays 500, 510 and 520.

FIG. 3 illustrates a scene in which vehicle 10 is about to drive into the right-turn lane and turn right. In this scene, as illustrated in FIG. 3, when vehicle 10 is about to turn right at the intersection, vehicle 20 is driving into the intersection from the right, and pedestrian 30 is entering the intersection from the left.

When for instance vehicle 10 is driving in the autonomous driving mode, display controller 120 causes display 500 to display image 600 including, for example, an arrow showing the traveling direction of vehicle 10 and the speed limit for the road at the current location. It should be noted that when vehicle 10 is driving in the manual driving mode, display controller 120 may cause display 500 to display an image that does not include the arrow showing the traveling direction.

For instance, display controller 120 causes display 510 to display image 610 showing the results of detecting objects. Image 610 is, for example, an image in which a frame surrounding a detected object is superimposed on an image taken by the camera. It should be noted that in the image, an identification result showing what the detected object is may be superimposed near the frame. In addition, display controller 120 may cause display 510 to display the navigation screen of the car navigation system, that is, an image showing a road map including the current location and its surroundings, a scheduled driving route, and the current location of vehicle 10. In addition, display controller 120 may cause display 510 to display a video of video content. The video content may be obtained from broadcast waves, an optical disc, such as a DVD or a Blu-ray (registered trademark) Disc (BD), or video data stored in other storage devices or may be obtained by streaming delivery via the Internet.

Display controller 120 causes display 520 to display image 620 including, for example, a speedometer showing the driving speed, a tachometer showing the engine rpm, and a power meter showing an engine or motor load.

In addition, when obtainer 110 detects that the first switching will be performed, before the first switching is complete (that is, before the timing of the first switching), display controller 120 causes display 500 of vehicle 10 to display first information and third information. When obtainer 110 detects that the first switching will be performed, before the first switching is complete (that is, before the timing of the first switching), display controller 120 further causes display 510 to display second information. Thus, the period during which display 500 displays the first information and the third information at least overlaps with the period during which display 510 displays the second information.

In addition, in the period until the completion of the first switching, display controller 120 may change the display style of at least one of the first information, the second information, and the third information from a first display style to a second display style. For instance, display controller 120 may change the styles of frame lines surrounding the above information items, the colors of the information items, and the way of blinking the information items (a combination pattern of on and off times). It should be noted that display controller 120 may change the display style by switching between two or more display styles.

A first example of the first information, the second information, and the third information is described. In the first example, after detection that the first switching will be performed, in the period until the first switching is complete, display 500 is caused to display the first information and the third information, and display 510 is caused to display the second information.

FIGS. 5A to 5F illustrate the first example of images displayed on displays 500, 510, and 520 when the driving mode of vehicle 10 is switched from the autonomous driving mode to the manual driving mode.

Figure 5A:
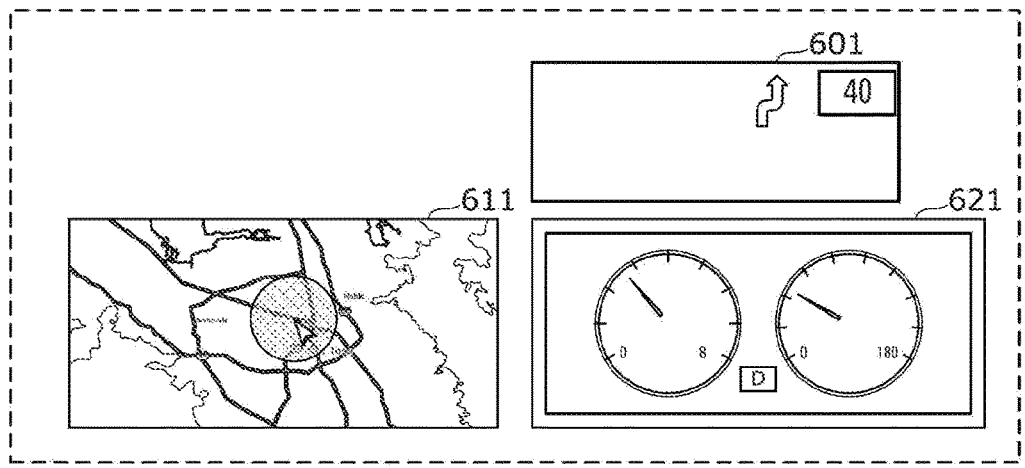
FIG. 5A illustrates a first example of images displayed on the displays.
Figure 5B:
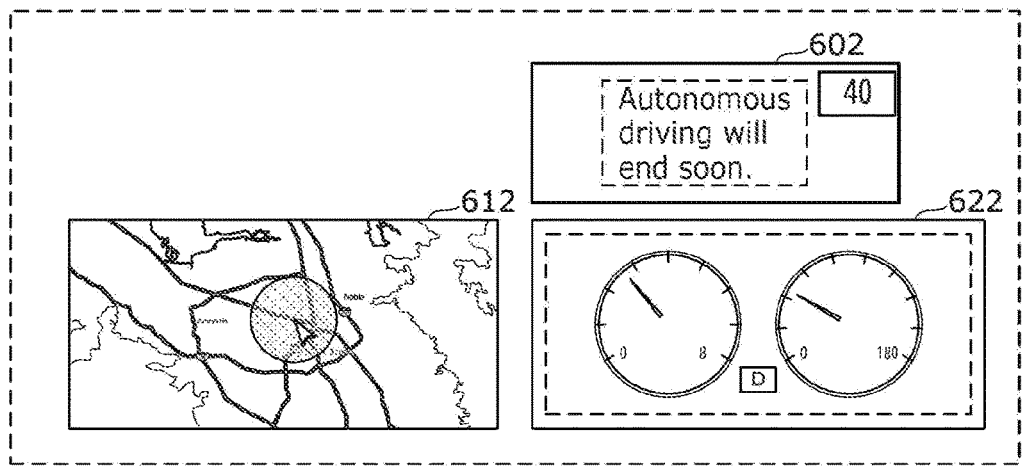
FIG. 5B illustrates the first example of images displayed on the displays.
Figure 5C:
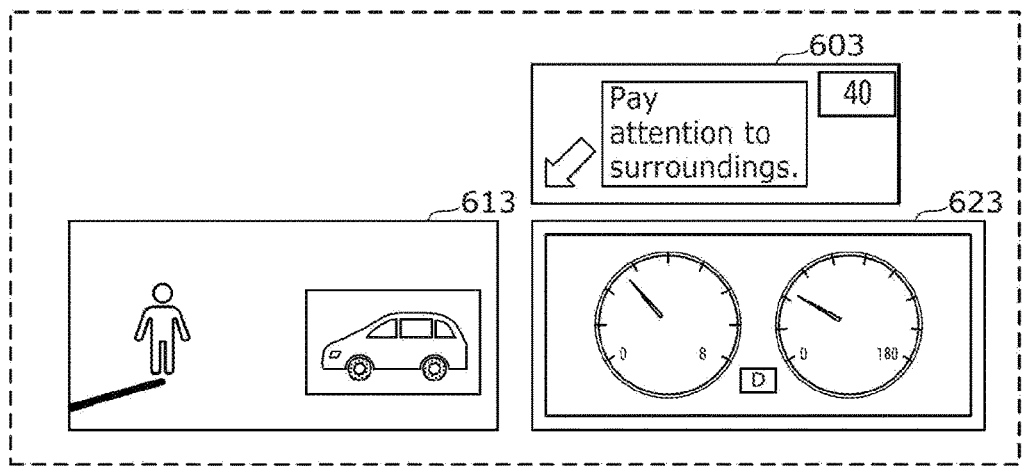
FIG. 5C illustrates the first example of images displayed on the displays.
Figure 5D:
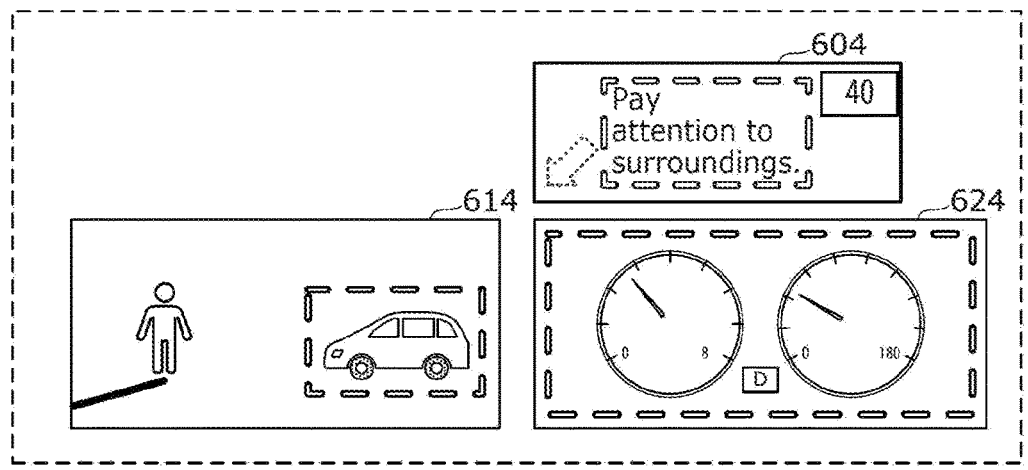
FIG. 5D illustrates the first example of images displayed on the displays.
Figure 5E:
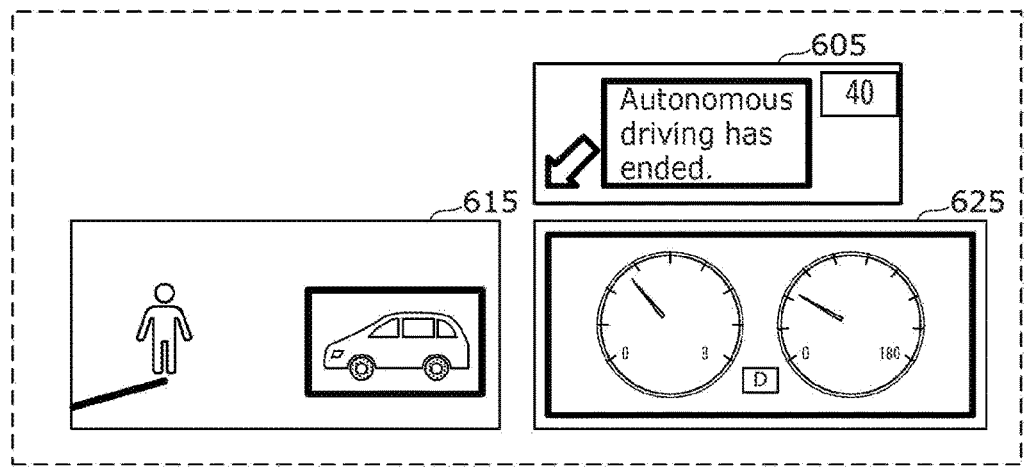
FIG. 5E illustrates the first example of images displayed on the displays.
Figure 5F:
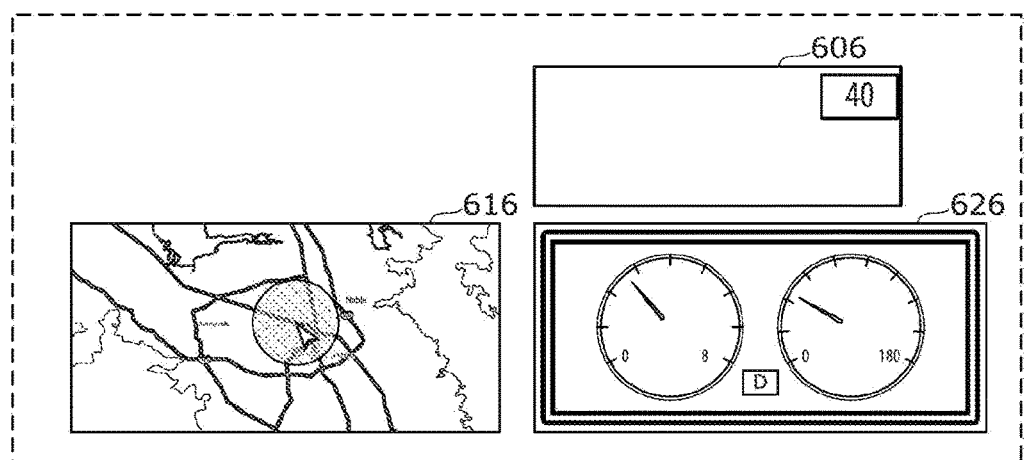
FIG. 5F illustrates the first example of images displayed on the displays.

FIG. 5A illustrates the first example of images displayed on displays 500, 510, and 520 in the autonomous driving mode. FIGS. 5B to 5E illustrate the first example of images displayed on displays 500, 510, and 520 in the period during which the driving mode is switched from the autonomous driving mode to the manual driving mode. FIG. 5F illustrates the first example of images displayed on displays 500, 510, and 520 in the manual driving mode.

As illustrated in FIG. 5A, when for instance vehicle 10 is driving in the autonomous driving mode, display controller 120 causes display 500 to display image 601 including an arrow showing the traveling direction of vehicle 10 and the speed limit for the road at the current location. When for instance vehicle 10 is driving in the autonomous driving mode, display controller 120 further causes display 510 to display the navigation screen of the car navigation system, that is, image 611 showing a road map including the current location and its surroundings, a scheduled driving route, and the current location of vehicle 10. It should be noted that display controller 120 may cause display 510 to display image 601 as illustrated in FIG. 3. Display controller 120 further causes display 520 to display image 621 including, for example, a speedometer showing the driving speed and a tachometer showing the engine rpm. It should be noted that images 601, 611, 621 illustrated in FIG. 5A are simultaneously displayed on displays 500, 510, and 520, respectively.

When obtainer 110 detects that the first switching will be performed, display controller 120 displays images from the first to fourth stages on displays 500, 510, and 520 in the period until the first switching is complete. FIG. 5B illustrates examples of images displayed in the first stage. FIG. 5C illustrates examples of images displayed in the second stage. FIG. 5D illustrates examples of images displayed in the third stage. FIG. 5E illustrates examples of images displayed in the fourth stage.

As illustrated in FIG. 5B, in the first stage, display controller 120 causes display 500 to display image 602 including the notice that the autonomous driving mode is going to end. The notice is an example of the first information indicating that the driving mode will be switched from the autonomous driving mode to the manual driving mode. At this time, display controller 120 causes display 510 to display image 612, which is the same image as image 611, and causes display 520 to display image 622 generated by changing the display style of image 621. Here, images 602 and 622 are displayed in a first display style that shows being in the first stage before completion of the first switching. For instance, images 602 and 622 each include a frame shown by a dashed line. It should be noted that images 602 and 622 may include a frame or text in a first color instead of the frame shown by the dashed line. Image 612 may also be displayed in the first display style. That is, image 612 may include a frame shown by a dashed line. It should be noted that images 602, 612, 622 illustrated in FIG. 5B are simultaneously displayed on displays 500, 510, and 520, respectively.

Then, as illustrated in FIG. 5C, in the second stage, display controller 120 causes display 500 to display image 603 including the notice that suggests paying attention to the surroundings and an arrow showing that display 510 is displaying information (second information) useful for paying attention to the surroundings. The notice is another example of the first information indicating that the driving mode will be switched from the autonomous driving mode to the manual driving mode. The arrow shows the direction from display 500 toward display 510 and is an example of the third information indicating that display 510 is displaying the second information. The third information may indicate the position of an area displaying the second information by the arrow showing the direction from display 500 toward display 510 or may be an image showing that which portion within a frame representing the periphery of the entire display area is displaying the second information.

At this time, display controller 120 causes display 510 to display image 613 showing the results of detecting objects and causes display 520 to display image 623 generated by changing the display style of image 622. Image 613 showing the results of detecting the objects is an example of the second information for assisting the user of vehicle 10 in driving in the manual driving mode. It should be noted that the second information may be an image showing at least a part of the surroundings of vehicle 10, an image in which the results of identifying the objects are superimposed on the above image, information indicating that a pedestrian or a vehicle is approaching vehicle 10, information indicating the driving state of vehicle 10, or traffic jam information regarding the scheduled driving route for vehicle 10. The information indicating the driving state may be the driving speed of vehicle 10, the traveling direction of vehicle 10, a steering angle, or remaining fuel or energy. Here, images 603, 613, 623 are displayed in a second display style that shows being in the second stage before the completion of the first switching. For instance, images 603, 613, 623 each include a frame shown by a thin continuous line. It should be noted that images 603, 613, 623 may include a frame or text in a second color instead of the frame shown by the thin continuous line. It should be noted that images 603, 613, 623 illustrated in FIG. 5C are simultaneously displayed on displays 500, 510, and 520, respectively.

Then, as illustrated in FIG. 5D, in the third stage, display controller 120 causes display 500 to display image 604 generated by changing the display style of image 603. At this time, display controller 120 causes display 510 to display image 614 generated by changing the display style of image 613 and causes display 520 to display image 624 generated by changing the display style of image 623. It should be noted that the notice included in image 604 is an example of the first information, and the arrow included in image 604 is an example of the third information. In addition, image 614 is an example of the second information. Here, images 604, 614, 624 are displayed in a third display style that shows being in the third stage before the completion of the first switching. For instance, images 604, 614, 624 each include a frame shown by an outlined dashed line. It should be noted that images 604, 614, 624 may include a frame or text in a third color instead of the frame shown by the outlined dashed line. It should be noted that images 604, 614, 624 illustrated in FIG. 5D are simultaneously displayed on displays 500, 510, and 520, respectively.

Then, as illustrated in FIG. 5E, in the fourth stage, display controller 120 causes display 500 to display image 605 including a notice indicating the end of the autonomous driving mode (that is, a notice indicating the completion of the switching to the manual driving mode) and an arrow showing that display 510 is displaying the second information. At this time, display controller 120 causes display 510 to display image 615 generated by changing the display style of image 614 and causes display 520 to display image 625 generated by changing the display style of image 624. It should be noted that the notice included in image 605 is an example of the first information, and the arrow included in image 605 is an example of the third information. In addition, image 615 is an example of the second information. Here, images 605, 615, 625 are displayed in a fourth display style that shows being in the fourth stage indicating the completion of the first switching. For instance, images 605, 615, 625 each include a frame shown by a thick continuous line. It should be noted that images 605, 615, 625 may include a frame or text in a fourth color instead of the frame shown by the thick continuous line. It should be noted that images 605, 615, 625 illustrated in FIG. 5E are simultaneously displayed on displays 500, 510, and 520, respectively.

It should be noted that as long as the first display style, the second display style, the third display style, and the fourth display style are different display styles, the display styles are not limited to the exemplified display styles. As long as the first color, the second color, the third color, and the forth color are different colors, any colors may be used. For instance, the first color, the second color, the third color, and the forth color may be purple, pink, orange, and yellow, respectively.

Finally, as illustrated in FIG. 5F, soon after the completion of the switching to the manual driving mode, display controller 120 causes display 500 to display image 606 including, for example, the speed limit for the road at the current location. At this time, display controller 120 causes display 510 to display the navigation screen of the car navigation system, that is, image 616 showing the road map including the current location and its surroundings, the scheduled driving route, and the current location of vehicle 10. Display controller 120 causes display 520 to display image 626 generated by changing the display style of image 625. Here, image 626 is displayed in a display style that shows being in the manual driving mode. For instance, image 626 includes a frame shown by a double line. It should be noted that image 626 may include a frame or text in a color different from the first to fourth colors instead of the frame shown by the double line. It should be noted that images 606, 616, 626 illustrated in FIG. 5F are simultaneously displayed on displays 500, 510, and 520, respectively.

A second example of the first information, the second information, and the third information is described. In the second example, after detection that the first switching will be performed, in the period until the first switching is complete, display 520 is caused to display the first information and the third information, and displays 500 and 510 are caused to display the second information.

FIGS. 6A to 6E illustrate the second example of images displayed on displays 500, 510, and 520 when the driving mode of vehicle 10 is switched from the autonomous driving mode to the manual driving mode.

Figure 6A:
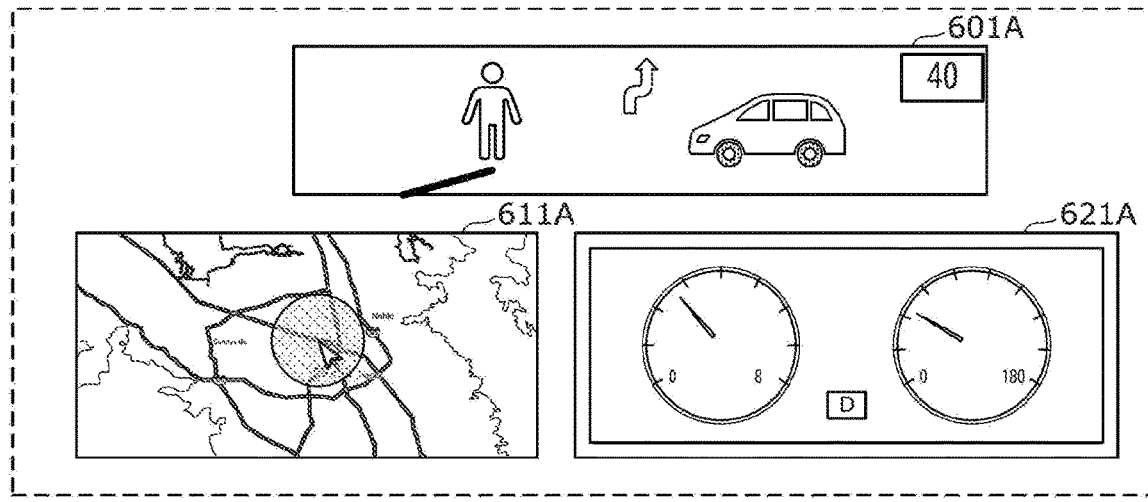
FIG. 6A illustrates a second example of images displayed on the displays.
Figure 6B:
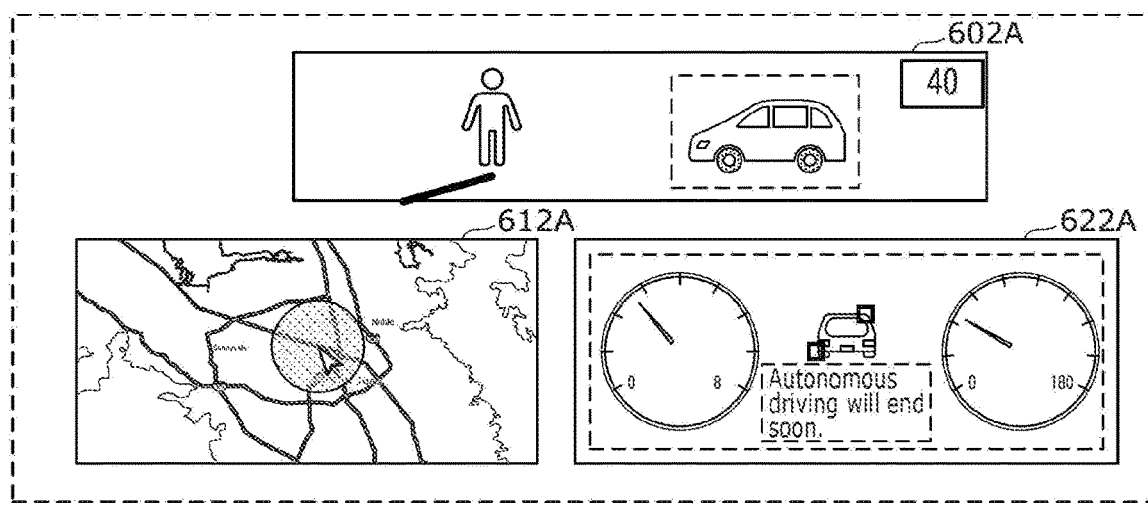
FIG. 6B illustrates the second example of images displayed on the displays.
Figure 6C:
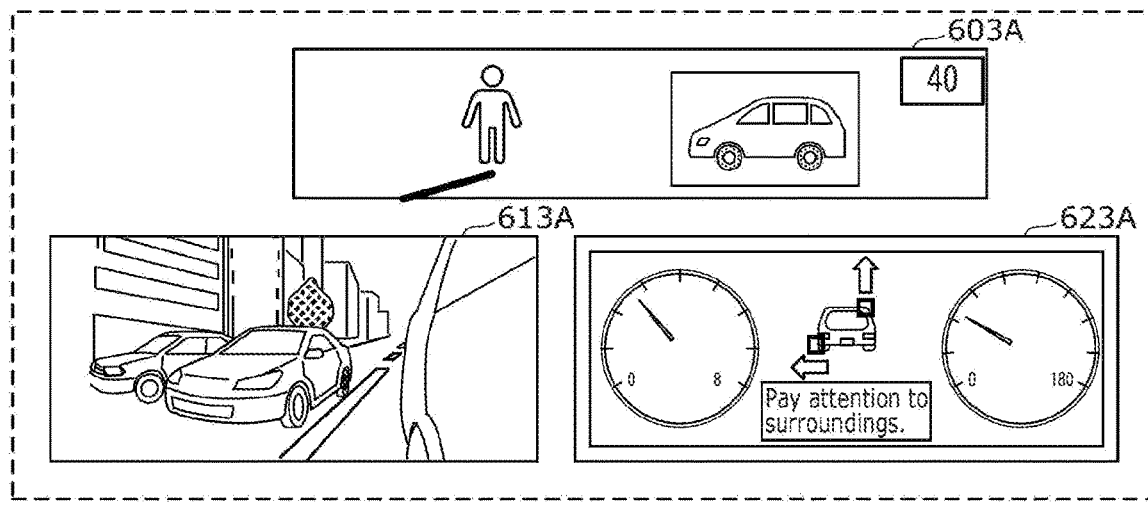
FIG. 6C illustrates the second example of images displayed on the displays.
Figure 6D:
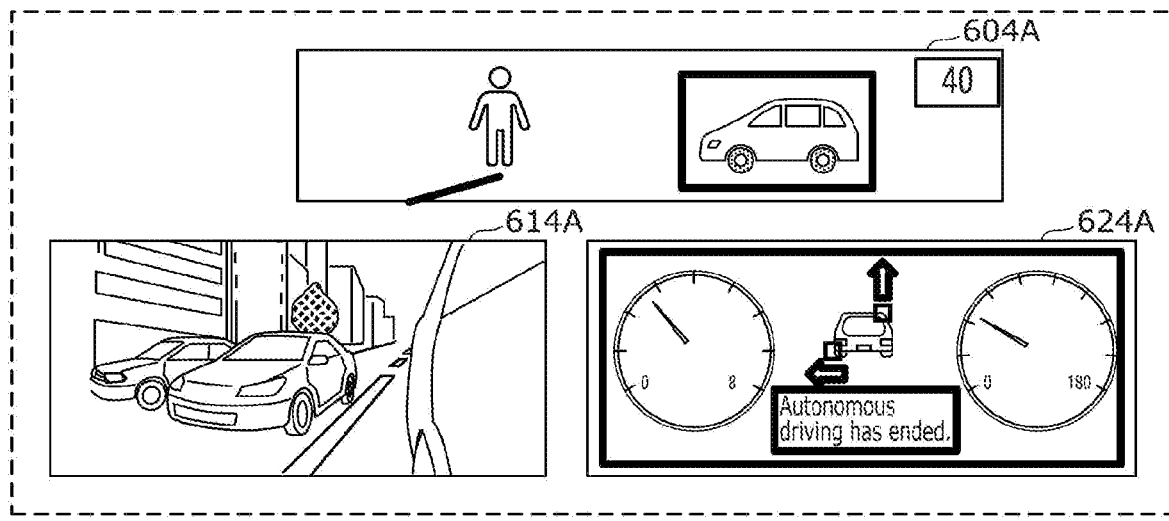
FIG. 6D illustrates the second example of images displayed on the displays.
Figure 6E:
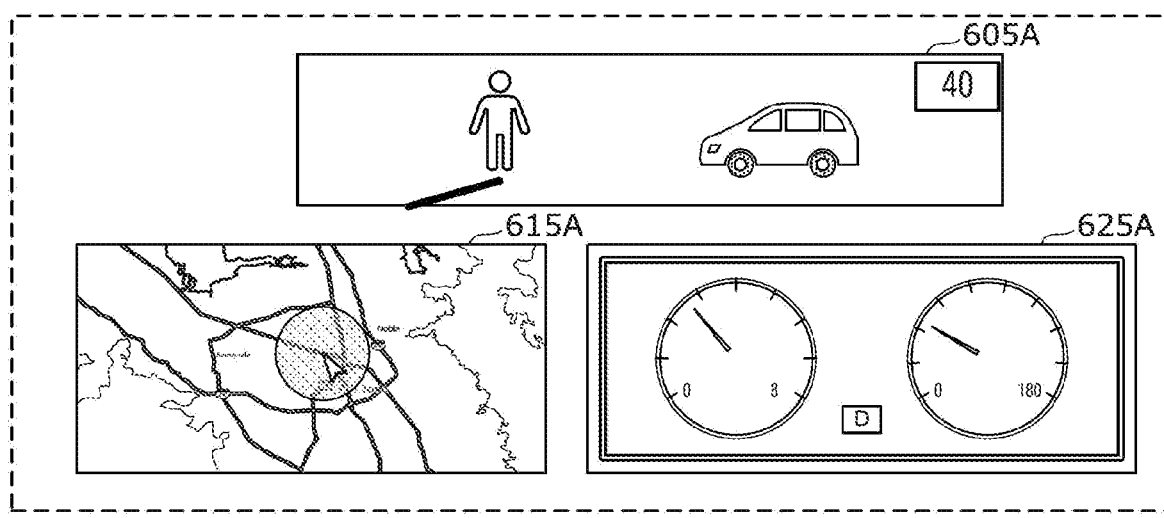
FIG. 6E illustrates the second example of images displayed on the displays.

FIG. 6A illustrates the second example of images displayed on displays 500, 510, and 520 in the autonomous driving mode. FIGS. 6B to 6D illustrate the second example of images displayed on displays 500, 510, and 520 in the period during which the driving mode is switched from the autonomous driving mode to the manual driving mode. FIG. 6E illustrates the second example of images displayed on displays 500, 510, and 520 in the manual driving mode.

As illustrated in FIG. 6A, when for instance vehicle 10 is driving in the autonomous driving mode, display controller 120 causes display 500 to display image 601A including, for example, an arrow showing the traveling direction of vehicle 10 and the speed limit for the road at the current location. When for instance vehicle 10 is driving in the autonomous driving mode, display controller 120 further causes display 510 to display the navigation screen of the car navigation system, that is, image 611A showing a road map including the current location and its surroundings, a scheduled driving route, and the current location of vehicle 10. Display controller 120 further causes display 520 to display image 621A including, for example, a speedometer showing the driving speed and a tachometer showing the engine rpm. It should be noted that images 601A, 611A, 621A illustrated in FIG. 6A are simultaneously displayed on displays 500, 510, and 520, respectively.

When obtainer 110 detects that the first switching will be performed, display controller 120 displays images from the first to third stages on displays 500, 510, and 520 in the period until the first switching is complete. FIG. 6B illustrates examples of images displayed in the first stage. FIG. 6C illustrates examples of images displayed in the second stage. FIG. 6D illustrates examples of images displayed in the third stage.

As illustrated in FIG. 6B, in the first stage, display controller 120 causes display 520 to display image 622A including the notice that the autonomous driving mode is going to end. The notice is an example of the first information indicating that the driving mode will be switched from the autonomous driving mode to the manual driving mode. At this time, display controller 120 causes display 500 to display image 602A showing the results of detecting objects and generated by changing the display style of image 601A. Image 602A showing the results of detecting the objects is an example of the second information for assisting the user of vehicle 10 in driving in the manual driving mode. Here, images 602A is displayed in a first display style that shows being in the first stage before completion of the first switching. For instance, images 602A includes a frame shown by a dashed line. It should be noted that image 602A may include a frame or text in a first color instead of the frame shown by the dashed line. Image 612A may also be displayed in the first display style. That is, image 612A may include a frame shown by a dashed line. It should be noted that images 602A, 612A, 622A illustrated in FIG. 6B are simultaneously displayed on displays 500, 510, and 520, respectively.

Then, as illustrated in FIG. 6C, in the second stage, display controller 120 causes display 520 to display image 623A including the notice that suggests paying attention to the surroundings and two arrows showing that displays 500 and 510 are displaying information (the second information) useful for paying attention to the surroundings. The notice is another example of the first information indicating that the driving mode will be switched from the autonomous driving mode to the manual driving mode. One of the two arrows shows the direction from display 520 toward display 500, and the other shows the direction from display 520 toward display 510. The two arrows are examples of the third information indicating that display 500 and display 510 are displaying the second information. At this time, display controller 120 causes display 500 to display image 603A generated by changing the display style of image 602A and causes display 510 to display image 613A of an area behind and to the left of vehicle 10, taken by a camera (not illustrated). Here, images 603A, 613A, and 623A are displayed in a second display style that shows being in the second stage before the completion of the first switching. For instance, images 603A, 613A, 623A each include a frame shown by a thin continuous line. It should be noted that images 603A, 613A, 623A may include a frame or text in a second color instead of the frame shown by the thin continuous line. It should be noted that images 603A, 613A, 623A illustrated in FIG. 6C are simultaneously displayed on displays 500, 510, and 520, respectively.

Then, as illustrated in FIG. 6D, in the third stage, display controller 120 causes display 520 to display image 624A including a notice indicating the end of the autonomous driving mode (that is, a notice indicating the completion of the switching to the manual driving mode) and two arrows showing that displays 500 and 510 are displaying the second information. At this time, display controller 120 causes display 500 to display image 604A generated by changing the display style of image 603A and causes display 510 to display image 614A generated by changing the display style of image 613A. It should be noted that the notice included in image 624A is an example of the first information, and the two arrows included in image 624A are examples of the third information. In addition, images 604A and 614A are examples of the second information. Here, images 604A, 614A, and 624A are displayed in a third display style that shows being in the third stage indicating the completion of the first switching. For instance, images 604A, 614A, 624A each include a frame shown by a thick continuous line. It should be noted that images 604A, 614A, 624A may include a frame or text in a third color instead of the frame shown by the thick continuous line. It should be noted that images 604A, 614A, 624A illustrated in FIG. 6D are simultaneously displayed on displays 500, 510, and 520, respectively.

It should be noted that as long as the first display style, the second display style, and the third display style are different display styles, the display styles are not limited to the exemplified display styles. As long as the first color, the second color, and the third color are different colors, any colors may be used. For instance, the first color, the second color, and the third color may be purple, pink, and orange, respectively.

Finally, as illustrated in FIG. 6E, soon after the completion of the switching to the manual driving mode, display controller 120 causes display 500 to display image 605A including, for example, the speed limit for the road at the current location. At this time, display controller 120 causes display 510 to display the navigation screen of the car navigation system, that is, image 615A showing the road map including the current location and its surroundings, the scheduled driving route, and the current location of vehicle 10 and causes display 520 to display image 625A generated by changing the display style of image 624A. Here, image 625A is displayed in a display style that shows being in the manual driving mode. For instance, image 625A includes a frame shown by a double line. It should be noted that image 625A may include a frame or text in a color different from the first to third colors instead of the frame shown by the double line. It should be noted that images 605A, 615A, 625A illustrated in FIG. 6E are simultaneously displayed on displays 500, 510, and 520, respectively.

Display controller 120 may create information items, such as the first information, the second information, and the third information, to be displayed on displays 500, 510, and 520 or select from images stored in storage 130. The information items created by display controller 120 may be stored in storage 130.

The first information, the second information, and the third information (that is, images) are stored in storage 130. In addition, images for creating the first information, the second information, and the third information (that is, images) may be stored in storage 130.

For instance, display control device 100 is embodied as a computer including, for example, a communication interface, non-volatile memory in which a program is stored, volatile memory, which is a temporary storage area used to execute the program, input and output ports for transmitting and receiving a signal, and a processor for executing the program. Here, the communication interface communicates with driving assistance device 200, object detection device 300, location detection device 350, gaze detection device 400, displays 500, 510, 520, and sound device 530.

As displays 500, 510, and 520 are described above with reference to FIG. 1, detailed explanations for the displays are omitted here.

Sound device 530 is described below.

Sound device 530 outputs a sound under control of display control device 100. Sound device 530 may output a sound by outputting a sound signal reproduced by display control device 100. Sound device 530 is made up of, for example, an amplifier and a speaker.

Specific examples of information items (images) displayed on displays 500, 510, and 520 are described.

[Operation]

Operation of display system 1 is described. FIG. 7 is a sequence diagram illustrating an example of operation of display system 1.

First, driving assistance device 200 transmits, to display control device 100, switching information indicating that the driving mode will be switched from the autonomous driving mode to the manual driving mode (S11). Specifically, driving assistance device 200 determines whether vehicle 10 can drive in the autonomous driving mode, according to, for example, the driving state of vehicle 10 and the situation surrounding vehicle 10. After determining that vehicle 10 cannot drive in the autonomous driving mode, driving assistance device 200 transmits the switching information to display control device 100.

Next, display control device 100 obtains, from driving assistance device 200, the switching information indicating that the driving mode will be switched from the autonomous driving mode to manual driving mode (S12).

Then, display control device 100 performs display control on displays 500, 510, and 520 in the period until the switching from the autonomous driving mode to the manual driving mode is complete (S13). Specifically, display control device 100 performs display control on displays 500, 510, and 520 as illustrated in FIGS. 5A to 5F. It should be noted that display control device 100 may perform display control on displays 500, 510, and 520 as illustrated in FIGS. 6A to 6E.

Then, driving assistance device 200 switches the driving mode from the autonomous driving mode to the manual driving mode at the timing of the switching (S14).

Then, driving assistance device 200 transmits, to display control device 100, switching information indicating that the driving mode will be switched from the manual driving mode to the autonomous driving mode (S15). Specifically, driving assistance device 200 determines whether vehicle 10 can drive in the autonomous driving mode, according to, for example, the driving state of vehicle 10 and the situation surrounding vehicle 10. After determining that vehicle 10 can drive in the autonomous driving mode, driving assistance device 200 transmits the switching information to display control device 100.

Then, display control device 100 obtains, from driving assistance device 200, the switching information indicating that the driving mode will be switched from the manual driving mode to the autonomous driving mode (S16).

Then, display control device 100 displays images showing that the current mode is the autonomous driving mode on displays 500, 510, and 520 (S17). For instance, display control device 100 may display images 601, 611, and 621 illustrated in FIG. 5A on displays 500, 510, and 520, respectively, or display images 601A, 611A, and 621A illustrated in FIG. 6A on displays 500, 510, and 520, respectively.

After that, driving assistance device 200 switches the driving mode from the manual driving mode to autonomous driving mode at the timing of switching (S18).

Effects

Display control device 100 according to the embodiment performs display control on displays 500, 510, and 520 of vehicle 10. Display control device 100 includes obtainer 110 and display controller 120. Obtainer 110 obtains switching information indicating that switching between driving modes including the autonomous driving mode and the manual driving mode will be performed in vehicle 10. When the switching information indicates that the first switching, which is switching from the autonomous driving mode to the manual driving mode, will be performed, before completion of the first switching, display controller 120 (i) causes display 500 to display the first information indicating that the first switching will be performed and the third information indicating that display 510 is displaying the second information for assisting the user of vehicle 10 in driving in the manual driving mode and (ii) causes display 510 to display the second information.

Thus, by displaying the two information items, the first information and the third information, on display 500, it is possible to notify the user that the first switching will be performed and that display 510 is displaying the second information for assisting the user of vehicle 10 in driving in the manual driving mode. Display 500 is caused to display the third information, and display 510 is caused to display the second information. Thus, displaying of the third information guides the gaze of the user to display 510, which enables the user to visually check the second information. Thus, the user can be aware that the first switching will be performed and aware of the information useful for manual driving at the time of the switching. Accordingly, the user can properly drive vehicle 10 soon after the driving mode is switched from the autonomous driving mode to the manual driving mode.

In addition, in display control device 100, the third information indicates the position of an area displaying the second information. Thus, the user can readily identify the position of the area displaying the second information. Accordingly, the user can readily visually check the second information.

In addition, in display control device 100, in the period until the completion of the first switching, display controller 120 changes the display style of at least one of the first information, the second information, and the third information from the first display style to the second display style. Thus, it is possible to notify, in stages, the user that the timing of the switching from the autonomous driving mode to the manual driving mode is approaching. Accordingly, the user can be aware of the time taken to switch to the manual driving mode.

In addition, display 500 is a head-up display, and display 510 is a display mounted on the dashboard of vehicle 10. Thus, the user can look at display 500 while looking forward (looking at the area ahead of the vehicle). Accordingly, the user can readily check the first information and the third information while preparing for driving. In addition, by looking at display 510 mounted on the dashboard, the user can visually check the second information.

[Variation 1]

Figure 8A:
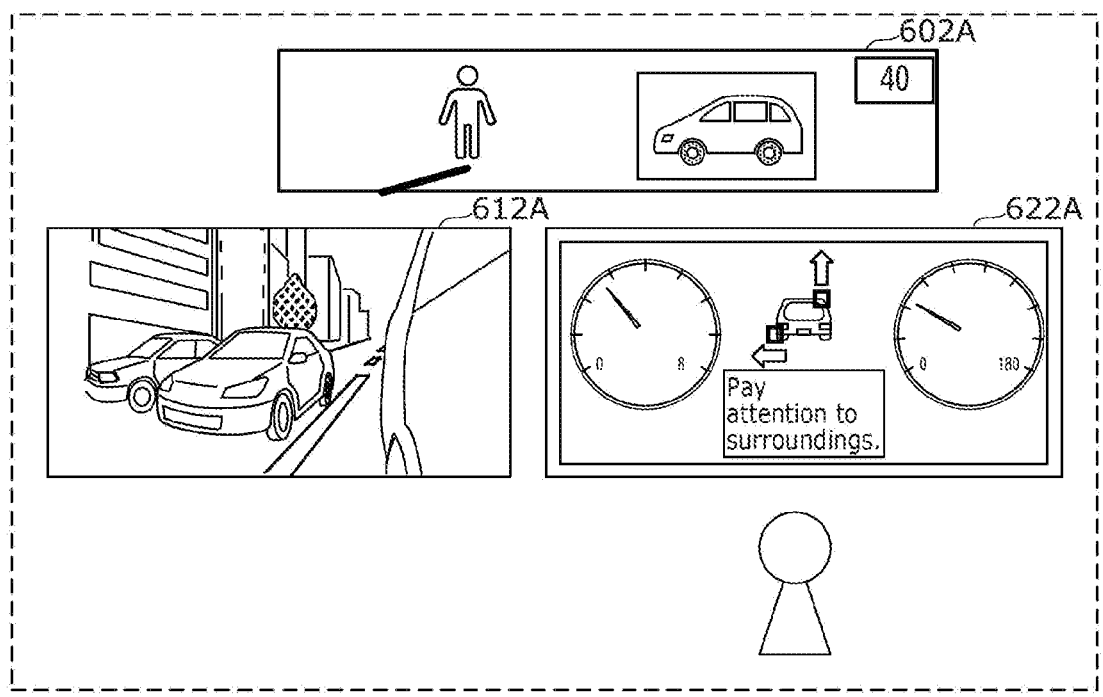
FIG. 8A illustrates examples of information items displayed on displays according to Variation 1.
Figure 8B:
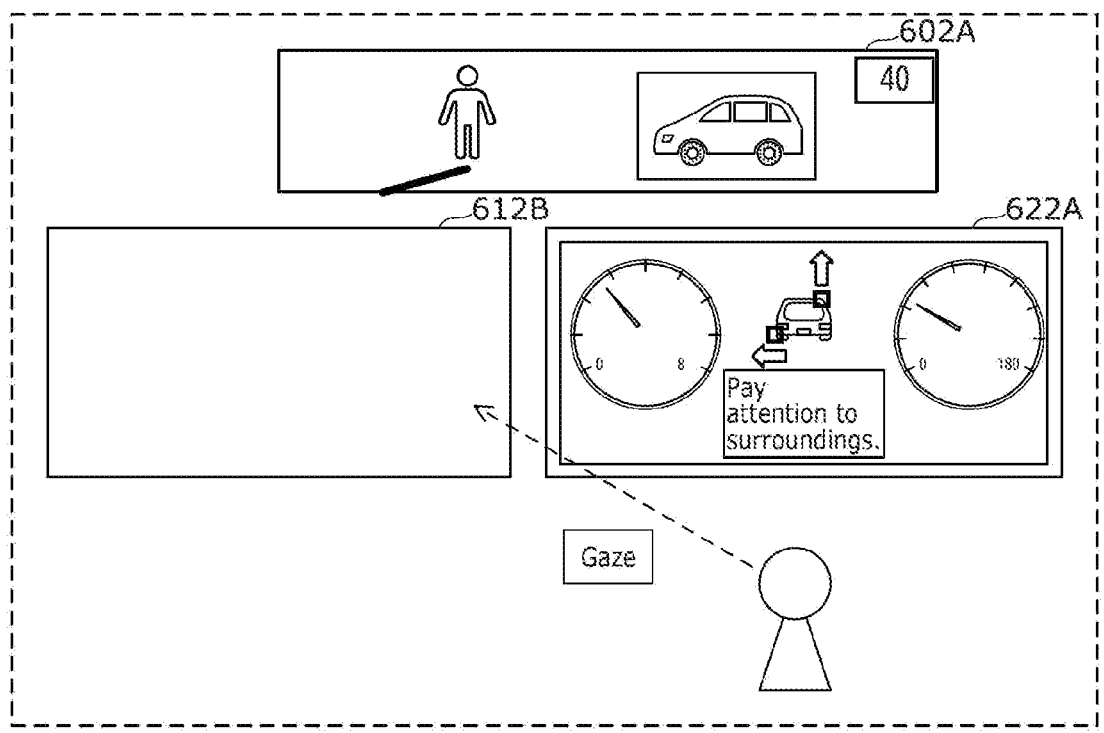
FIG. 8B illustrates examples of information items displayed on the displays according to Variation 1.

FIG. 8A illustrates examples of information items displayed on displays 500, 510, and 520 according to Variation 1. FIG. 8B illustrates relationships between a user's gaze and the information items displayed on displays 500, 510, and 520 according to Variation 1.

Display control device 100 may further control images displayed on displays 500, 510, and 520 by using gaze information output by gaze detection device 400. Specifically, as illustrated in FIG. 8A, when display 500 is displaying image 602A as second information and display 510 is displaying image 612A as the second information, that is, the second information includes two or more notices, display control device 100 may perform display control for images 602A and 612A displayed on displays 500 and 510, according to the user's gaze based on the gaze information.

For instance, when displays 500 and 510 are displaying images 602A and 612A, respectively, according to the user's gaze indicated by the gaze information, display control device 100 may identify an image displayed in the area at which the user's gaze is directed. Then, display control device 100 may cause either display 500 or display 510 displaying the identified image (in this case, display 510) to hide the identified image by switching the screen to screen 612B. For instance, as illustrated in FIG. 8B, when the user is looking at display 510, display control device 100 identifies image 612A displayed on display 510, according to the user's gaze indicated by the gaze information and controls display 510 so as not to display identified image 612A on display 510.

It should be noted that in the example illustrated in FIG. 8A, images 602A and 612A (two images) included in the second information are displayed on displays 500 and 510 (two displays). However, the two images may be displayed on one display. Even in this case, display control device 100 may identify an image displayed in the area at which the user's gaze is directed, according to the user's gaze indicated by the gaze information and cause the display to hide the identified image. The notices do not have to be images which are simultaneously displayed or hidden and just need to be displayed on one or more displays at the same time in the same period.

Thus, the display status of the notice presumably looked at and checked by the user is changed to hide, which can reduce inconvenience caused by notices being displayed on one or more displays.

[Variation 2]

When obtainer 110 obtains, before completion of the first switching, new switching information indicating that the second switching, which is switching to the autonomous driving mode, will be performed, display control device 100 according to the embodiment may cause, before completion of the second switching, display 500 to display fourth information indicating that the second switching will be performed. This enables a user to be aware that the driving mode will return to the autonomous driving mode.

Figure 9:
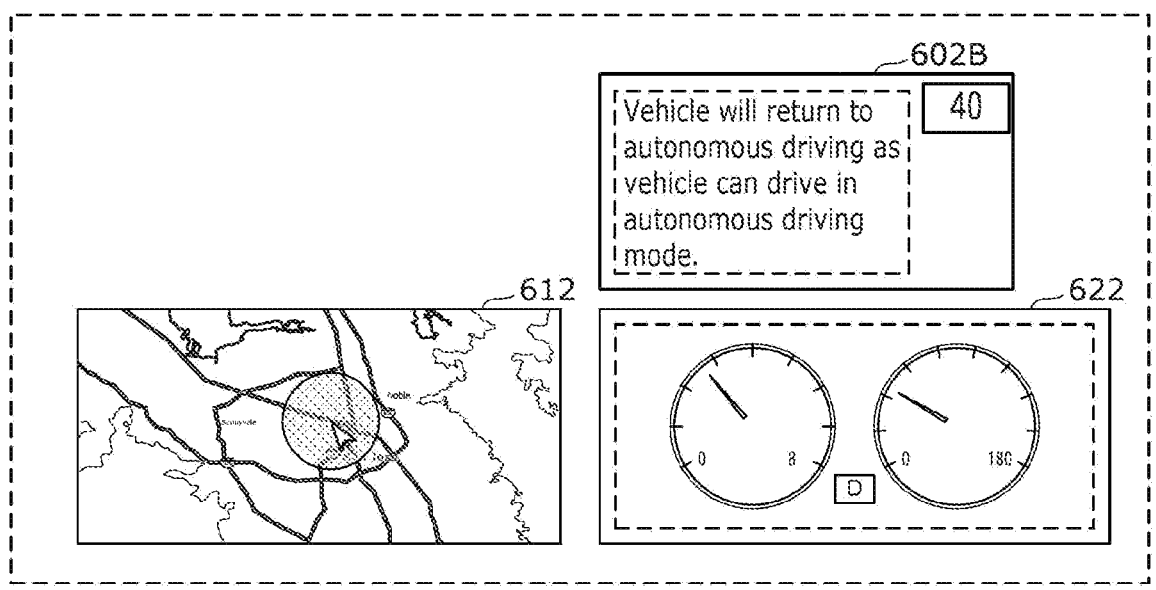
FIG. 9 illustrates examples of information items displayed on displays when fourth information according to Variation 2 is displayed.

FIG. 9 illustrates examples of information items displayed on displays 500, 510, and 520 when fourth information is displayed.

The period from when obtainer 110 detects that the first switching will be performed until when the first switching is complete is described with reference to FIGS. 5B to 5E. In the period, when for instance obtainer 110 obtains new switching information indicating that the second switching will be performed, display control device 100 may display, as the fourth information, image 602B including the notice indicating that vehicle 10 will return to the autonomous driving mode as vehicle 10 can drive in the autonomous driving mode. At this time, display control device 100 may cause display 510 to display the navigation screen of the car navigation system, that is, image 612 showing a road map including the current location and its surroundings, a scheduled driving route, and the current location of vehicle 10 and cause display 520 to display image 622 including a speedometer showing the driving speed and a tachometer showing the engine rpm. After displaying images 602B, 612, and 622 on displays 500, 510, and 520, respectively, display control device 100 may display images 601, 611, and 621 on displays 500, 510, and 520, respectively. At this time, driving assistance device 200 may return to the autonomous driving mode.

In addition, in the period until the completion of the first switching, display control device 100 changes the display style of at least one of the first information, the second information, and the third information from the first display style to the second display style. Consider a case in which before the completion of the first switching, obtainer 110 obtains new switching information indicating that the second switching, which is switching to the autonomous driving mode, will be performed. In this case, before the completion of the second switching, display control device 100 may (i) cause display 500 to display the fourth information indicating that the second switching will be performed and (ii) change the display style of at least one of the first information, the second information, and the third information from the second display style to the first display style. Specifically, display control device 100 may perform display control on displays 500, 510, and 520 so that the driving mode returns back to the autonomous driving mode from a stage in which the new switching information was obtained in the period before the completion of the first switching, the stage being one of the first to fourth stages. For instance, if the new switching information is obtained in the fourth stage, display control device 100 may cause display 500 to display the fourth information and then perform display control on displays 500, 510, and 520 so that images corresponding to the third stage, images corresponding to the second stage, images corresponding to the first stage, and the notice indicating the completion of the switching to the autonomous driving mode are displayed in the order named.

This enables the user to be aware of the time taken to return to the autonomous driving mode.

[Variation 3]

In the examples described in the embodiment, display control device 100 notifies the user of switching information by causing display 500 to display the first information indicating that the driving mode will be switched from the autonomous driving mode to the manual driving mode. However, the notification method is not limited to the above method. Display control device 100 may notify the user of the switching information by causing sound device 530 to output, by sound, the first information indicating that the driving mode will be switched from the autonomous driving mode to the manual driving mode.

Other Embodiments

The display control device, the display control method, and the recording medium according to one or more than one aspect are described on the basis of the embodiment. However, the present disclosure is not limited to the descriptions in the embodiment. The present disclosure may include, within the spirit of the present disclosure, one or more embodiments made by making various changes envisioned by those skilled in the art to the above embodiment.

For instance, in the embodiment, each of the structural elements which are the processing units of each device of display system 1 may be dedicated hardware or may be caused to function by executing a software program suitable for the structural element. Each structural element may be caused to function by a program executor, such as a central processing unit (CPU) or a processor, reading and executing the software program stored in a non-transitory recording medium, such as a hard disk or semiconductor memory.

It should be noted that the present disclosure includes the following cases.

(1) At least one of the devices described above is a computer system made up of, for example, a microprocessor, read only memory (ROM), random access memory (RAM), a hard disk unit, a display unit, a keyboard, and a mouse. Computer programs are stored in the RAM or the hard disk unit. When the microprocessor operates according to a computer program, the at least one of the devices can achieve the function. Here, to achieve a predetermined function, the computer program is made by combining instruction codes indicating instructions to the computer.

(2) A part or all of the structural elements of the at least one of the devices may be one system large scale integration (LSI). The system LSI is a super-multifunctional LSI manufactured by integrating multiple parts into one chip and specifically a computer system including a microprocessor, ROM, and RAM. Computer programs are stored in the RAM. When the microprocessor operates according to a computer program, the system LSI can achieve its function.

(3) A part or all of the structural elements of the at least one of the devices may be an IC card or a single module detachable from and attachable to the at least one device. The IC card or the module is a computer system including a microprocessor, ROM and RAM. The IC card or the module may include the above super-multifunctional LSI. When the microprocessor operates according to a computer program, the IC card or the module can achieve its function. The IC card or the module may be tamper-resistant.

(4) The present disclosure may be the method described above. The present disclosure may be a computer program provided for a computer to achieve the method and a digital signal made from the computer program.

The present disclosure may be a non-transitory computer-readable recording medium, such as a flexible disk, a hard disk, a compact disc (CD)-ROM, a DVD, a DVD-ROM, a DVD-RAM, a Blu-ray (BD) (registered trademark) disc, and semiconductor memory, in which a computer program or a digital signal is stored. The present disclosure may be the digital signal stored in such a recording medium.

The present disclosure may be transmission of a computer program or a digital signal via, for example, a network typified by a telecommunications line, a wireless or wired communication line, or the Internet or data broadcasting.

By storing a program or a digital signal in a recording medium and transferring the program or the digital signal to another independent computer system or by transferring the program or the digital signal to another independent computer system via, for example, the network, the independent computer system may perform processing.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings and claims are incorporated herein by reference in its entirety: Japanese Patent Application No. 2021-176685 filed on Oct. 28, 2021.

INDUSTRIAL APPLICABILITY

The present disclosure is useful as, for example, a display control device that can assist a user in properly driving a vehicle soon after the driving mode of the vehicle is switched from an autonomous driving mode to a manual driving mode.

The invention claimed is:

1. A display control device that performs display control on a first display and a second display of a vehicle, the second display being different from the first display, the display control device comprising:
   a processor; and
   a memory including a program that, when executed by the processor, causes the processor to perform functions, the functions including:
      obtaining switching information indicating that switching between driving modes, including an autonomous driving mode and a manual driving mode, is to be performed in the vehicle; and causing, before completion of a first switching, (i) the first display to display first information and third information and (ii) the second display to display second information when the switching information indicates that the first switching is to be performed, wherein the first switching is from the autonomous driving mode to the manual driving mode, the first information indicates that the first switching is to be performed, the second information assists a user of the vehicle in driving in the manual driving mode, and the third information, which is displayed on the first display, indicates that the second display, which is different from the first display, is displaying the second information that assists the user of the vehicle in driving in the manual mode.

2. The display control device according to claim 1, wherein the third information indicates a position of an area in the second display, which is displaying the second information.

3. The display control device according to claim 1, wherein the processor obtains gaze information indicating a gaze of the user, the second information includes a plurality of notices, and when the second display is displaying the plurality of notices, the processor identifies, according to the gaze of the user indicated by the gaze information, a notice displayed in an area at which the gaze of the user is directed and causes the second display to hide the notice identified by the processor.

4. The display control device according to claim 1, wherein in a period until the completion of the first switching, the processor changes a display style of at least one of the first information, the second information, or the third information from a first display style to a second display style.

5. The display control device according to claim 1, wherein when the processor obtains, before the completion of the first switching, new switching information indicating that a second switching is to be performed, the processor causes, before completion of the second switching, the first display to display fourth information indicating that the second switching is to be performed, the second switching being from the manual driving mode to the autonomous driving mode.

6. The display control device according to claim 1, wherein in a period until the completion of the first switching, the processor changes a display style of at least one of the first information, the second information, or the third information from a first display style to a second display style, and when the processor obtains, before the completion of the first switching, new switching information indicating that a second switching from the manual driving mode to the autonomous driving mode is to be performed, before completion of the second switching, the processor (i) causes the first display to display fourth information indicating that the second switching is to be performed and (ii) changes the display style of at least one of the first information, the second information, or the third information from the second display style to the first display style.

7. The display control device according to claim 1, wherein the first display is a head-up display, and the second display is mounted on a dashboard of the vehicle.

8. A display control method for performing display control on a first display and a second display of a vehicle, the second display being different from the first display, the display control method comprising:

obtaining switching information indicating that switching between driving modes, including an autonomous driving mode and a manual driving mode, is to be performed in the vehicle; and causing, before completion of a first switching, (i) the first display to display first information and third information and (ii) the second display to display second information when the switching information indicates that the first switching is to be performed, wherein the first switching is from the autonomous driving mode to the manual driving mode, the first information indicates that the first switching is to be performed, the second information assists a user of the vehicle in driving in the manual driving mode, and the third information indicates that the second display, which is different from the first display on which the third information is displayed, is displaying the second information that assists the user of the vehicle in driving in the manual mode.

9. A non-transitory computer-readable recording medium having stored there on a program for causing a computer to execute the display control method according to claim 8.

* * * * *